United States Patent
Kawakami et al.

(10) Patent No.: US 9,458,928 B2
(45) Date of Patent: Oct. 4, 2016

(54) VEHICLE DRIVE DEVICE

(71) Applicant: TOYOTA JIDOSHA KABUSHIKI KAISHA, Toyota (JP)

(72) Inventors: Takaho Kawakami, Susono (JP); Tomoaki Yanagida, Susono (JP); Kenta Kimura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/726,961

(22) Filed: Jun. 1, 2015

(65) Prior Publication Data
US 2015/0345619 A1 Dec. 3, 2015

(30) Foreign Application Priority Data

Jun. 2, 2014 (JP) ................................. 2014-114412

(51) Int. Cl.
*F16H 3/66* (2006.01)
*F16H 61/00* (2006.01)
*F02B 67/06* (2006.01)

(52) U.S. Cl.
CPC ............ *F16H 61/0028* (2013.01); *F16H 3/66* (2013.01); *F16H 61/0025* (2013.01); *F02B 67/06* (2013.01)

(58) Field of Classification Search
CPC .. F16H 61/0028; F16H 61/0025; F16H 3/66; F02B 67/06
USPC ........................................................ 74/15.2
See application file for complete search history.

(56) References Cited

U.S. PATENT DOCUMENTS

| | | | |
|---|---|---|---|
| 2,899,846 A * | 8/1959 | Tuck | F16H 3/66 475/281 |
| 5,635,805 A * | 6/1997 | Ibaraki | B60K 6/46 180/65.245 |
| 6,048,288 A * | 4/2000 | Tsujii | B60H 1/3222 180/65.25 |
| 7,301,302 B2 * | 11/2007 | Yoshii | B60K 6/26 180/65.1 |
| 8,056,659 B2 * | 11/2011 | Oba | B60K 6/387 180/65.225 |
| 8,257,213 B2 * | 9/2012 | Komada | B60K 6/36 475/5 |
| 8,660,724 B2 * | 2/2014 | Tarasinski | B60K 6/48 180/65.21 |
| 2009/0011887 A1 * | 1/2009 | Komada | B60K 6/36 475/5 |
| 2010/0065358 A1 * | 3/2010 | Harris | B60K 6/48 180/65.265 |
| 2011/0152026 A1 * | 6/2011 | Williams | B60K 17/344 475/86 |

(Continued)

FOREIGN PATENT DOCUMENTS

| | | |
|---|---|---|
| JP | 61-167763 | 7/1986 |
| JP | 2011-231844 | 11/2011 |

(Continued)

*Primary Examiner* — Karen Beck
(74) *Attorney, Agent, or Firm* — Oblon, McClelland, Maier & Neustadt, L.L.P

(57) ABSTRACT

A vehicle drive device includes an oil pump, a first one-way clutch, a first transmission path configured to transmit a driving force generated in an engine to the oil pump via the first one-way clutch, a second one-way clutch, a second transmission path configured to transmit a driving force from an output shaft of a transmission portion to the oil pump via the second one-way clutch, and a power transmission interruption device configured to interrupt transmission of the driving force generated in the engine to a drive wheel. A speed ratio between the engine and the oil pump in the first transmission path is set to be smaller than a speed ratio obtained by multiplying the smallest speed ratio of the transmission portion by a speed ratio between the transmission portion and the oil pump in the second transmission path.

3 Claims, 8 Drawing Sheets

(56) References Cited

U.S. PATENT DOCUMENTS

2012/0073281 A1* 3/2012 Hirose .................... B60K 6/48
                                                        60/439
2012/0277060 A1   11/2012 Kubo et al.
2015/0345619 A1* 12/2015 Kawakami .......... F16H 61/0025
                                                        74/15.2
2016/0082950 A1*  3/2016 Monden .................. F16H 3/725
                                                        477/3

FOREIGN PATENT DOCUMENTS

| JP | 2012-71752 | 4/2012 |
| WO | WO 2011/086828 A1 | 7/2011 |

* cited by examiner

VEHICLE DRIVE DEVICE

INCORPORATION BY REFERENCE

The disclosure of Japanese Patent Application No. 2014-114412 filed on Jun. 2, 2014 including the specification, drawings and abstract is incorporated herein by reference in its entirety.

BACKGROUND OF THE INVENTION

1. Field of the Invention

The invention relates to a vehicle drive device.

2. Description of Related Art

In many vehicle drive devices, a transmission is operated using a hydraulic pressure generated in an oil pump, and the oil pump as a source for generating the hydraulic pressure operates with a driving force generated in an engine. However, in the case where control in which the engine is stopped during running of a vehicle is performed in consideration of a fuel consumption rate or the like, the driving force generated in the engine is not transmitted to the oil pump. In this case, the oil pump cannot generate the hydraulic pressure and it becomes difficult to operate the transmission. To cope with this, in some vehicle drive devices of the related art, as a transmission path of the driving force for operating the oil pump, another path separate from a transmission path of the driving force from the engine to the oil pump is provided.

For example, in a hydraulic device of a vehicle transmission described in Japanese Patent Application Publication No. 61-167763 (JP 61-167763 A), the oil pump is connected to the engine via a first direction clutch, and the oil pump is further connected to an output shaft of the transmission via a second direction clutch. With this, even in the case where the engine is stopped during running of a vehicle and the vehicle coasts, it is possible to operate the oil pump with the driving force transmitted from the output shaft of the transmission to the oil pump, and generate the hydraulic pressure even during the stop of the engine.

SUMMARY OF THE INVENTION

However, in the case where the path in which the driving force from the engine is transmitted to the oil pump and the path in which the driving force from the output shaft of the transmission portion is transmitted to the oil pump are provided as the transmission paths of the driving force for operating the oil pump, there is a possibility that the path of the driving force transmitted to the oil pump is switched during running of the vehicle and a shock occurs. For example, in the case where fuel cut is performed during running of the vehicle, the rotational speed of the driving force transmitted to the oil pump from the output shaft of the transmission portion is higher than the rotational speed of the driving force transmitted to the oil pump from the engine, and hence the transmission path of the driving force transmitted to the oil pump is switched from the path on the side of the engine to the path on the side of the output shaft of the transmission portion. With this, a load to the engine is changed and an engine braking force is changed, and hence there is a possibility that the shock occurs when the engine braking force is changed.

The invention provides a vehicle drive device capable of suppressing the shock that occurs due to switching of the transmission path of the driving force to the oil pump.

A vehicle drive device according to an aspect of the invention includes an oil pump, a first one-way clutch, a first transmission path configured to transmit a driving force generated in an engine to the oil pump via the first one-way clutch, a second one-way clutch, a second transmission path configured to transmit a driving force from an output shaft of a transmission portion to the oil pump via the second one-way clutch, and a power transmission interruption device configured to interrupt transmission of the driving force generated in the engine to a drive wheel. A speed ratio between the engine and the oil pump in the first transmission path is set to be smaller than a speed ratio obtained by multiplying a smallest speed ratio of the transmission portion by a speed ratio between the transmission portion and the oil pump in the second transmission path.

The vehicle drive device may further include a first sprocket coupled to a rotating shaft of the engine via the first one-way clutch, a second sprocket coupled to the output shaft of the transmission portion via the second one-way clutch, a third sprocket coupled to the oil pump, and one chain or one belt configured to transmit power to any of the first sprocket, the second sprocket, and the third sprocket.

In the vehicle drive device, the transmission portion may be a stepped transmission, the stepped transmission may include brakes and clutches as engaging elements, and the power transmission interruption device may be constituted by at least one of the engaging elements.

The vehicle drive device according to the invention achieves an effect of being capable of suppressing the shock that occurs due to switching of the transmission path of the driving force to the oil pump.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, embodiments of a vehicle drive device according to the invention will be described in detail based on the drawings. Note that the invention is not limited to the embodiments. In addition, constituent elements in the following embodiments include those that can be easily replaced by a person skilled in the art or that are substantially equivalent.

Figure 1:
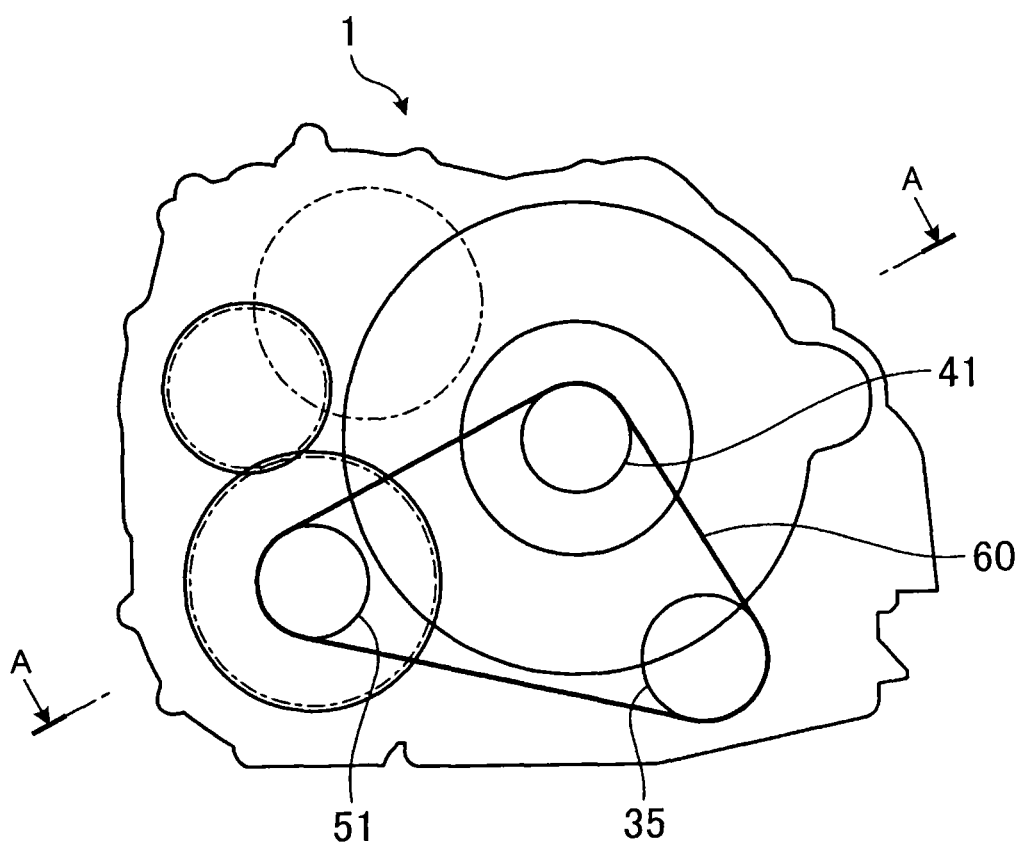
FIG. 1 is a side view of a vehicle drive device according to a first embodiment.
Figure 2:
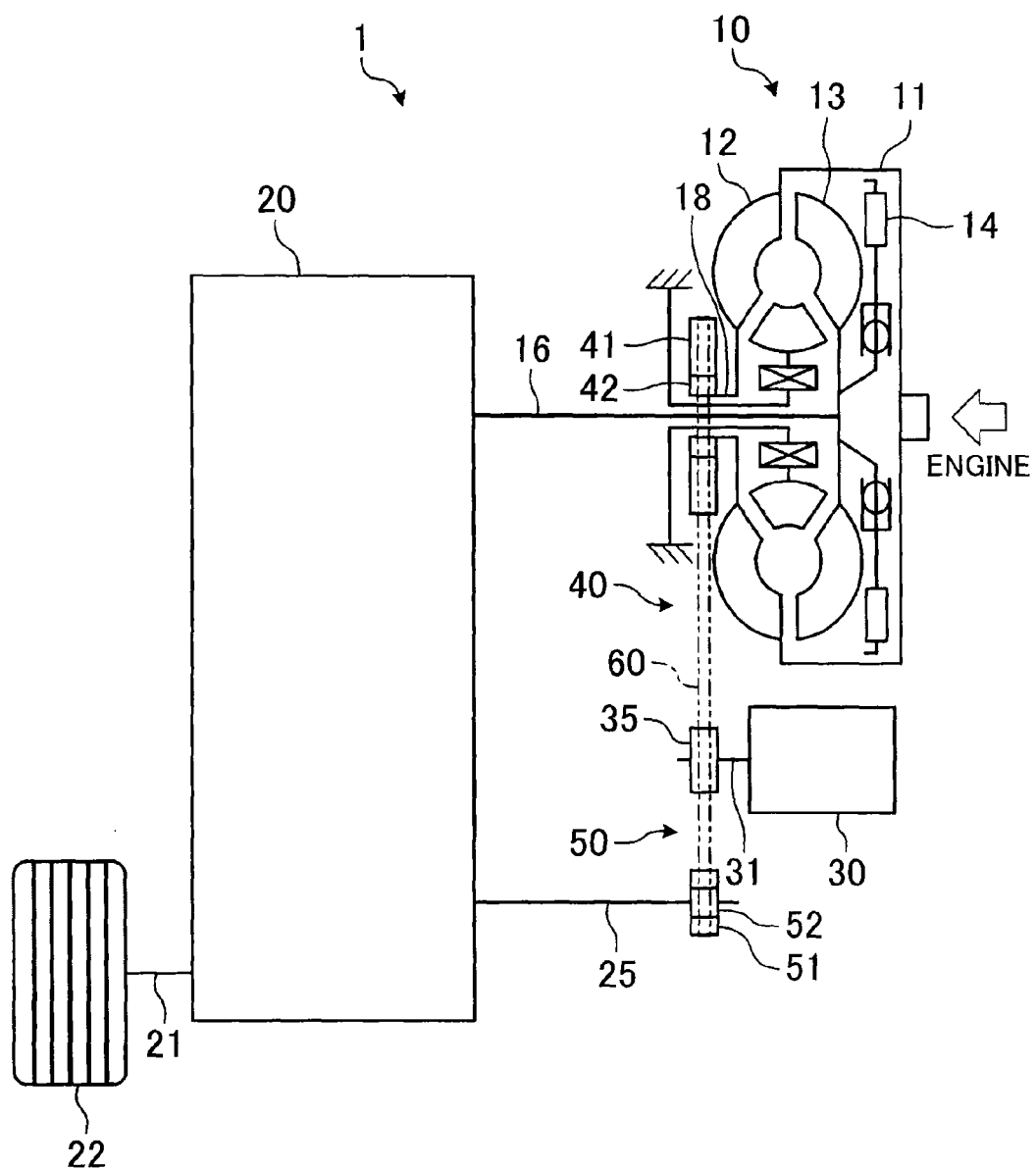
FIG. 2 is a cross-sectional view taken along the A-A direction of FIG. 1.

FIG. 1 is a side view of a vehicle drive device according to a first embodiment. FIG. 2 is a cross-sectional view taken along the A-A direction of FIG. 1. A vehicle drive device 1 shown in the drawings is mounted on a vehicle that uses an engine (not shown) as a power source during running, and the vehicle drive device 1 constitutes a power transmission path that transmits the power generated in the engine to a drive wheel 22. The vehicle drive device 1 has a torque converter 10 and a transmission portion 20. The torque converter 10 also functions as torque increase means and torque interruption means, and the engine is connected to the torque converter 10.

The torque converter 10 has a pump 12 and a turbine 13 that are capable of fluid transmission of the power transmitted from the engine, and the pump 12 is capable of rotating integrally with a cover 11 that rotates with a rotational torque transmitted from the engine. The rotational torque of the pump 12 is transmitted to the turbine 13 by the fluid transmission, and the turbine 13 is capable of rotating with the rotational torque. In addition, a transmission shaft 16 that outputs a driving force transmitted to the torque converter 10 from the engine is coupled to the turbine 13, and the driving force transmitted to the torque converter 10 from the engine is output by the transmission shaft 16.

The torque converter 10 includes a lock-up mechanism 14 that mechanically couples the turbine 13 and the cover 11. When the turbine 13 and the cover 11 are coupled to each other by the lock-up mechanism 14, the turbine 13 is capable of rotating with mechanical transmission of the driving force from the engine transmitted to the cover 11, and outputting the driving force without the intervention of the fluid transmission.

The transmission portion 20 is coupled to the other end of the transmission shaft 16 coupled to the torque converter 10, and the driving force output from the torque converter 10 can be transmitted to the transmission portion 20 by the transmission shaft 16. The transmission portion 20 is provided as a transmission that performs shifting by changing a speed ratio between an input rotational speed and an output rotational speed of the driving force transmitted from the torque converter 10 and outputting the driving force. The transmission portion 20 may include a stepped transmission mechanism that performs shifting by selecting one of a plurality of pre-set speed ratios, and may include a continuously variable transmission (CVT) mechanism that can change the speed ratio continuously.

A drive shaft 21 that transmits the driving force to the drive wheel 22 is coupled to the transmission portion 20, and the driving force subjected to the shifting in the transmission mechanism in the transmission portion 20 is transmitted to the drive wheel 22 by the drive shaft 21. The drive wheel 22 rotates with the driving force, and the vehicle can run with the rotation of the drive wheel 22.

In addition, the vehicle drive device 1 has an oil pump 30 that generates a hydraulic pressure that operates the individual portions when the vehicle drive device 1 is in operation. Further, the vehicle drive device 1 has a rotating shaft 18 of the engine and an output shaft 25 of the transmission portion 20 that transmit the driving force to the oil pump 30 by transmitting the rotational torque to the oil pump 30.

The rotating shaft 18 of the engine is coupled to the pump 12 of the torque converter 10 and is configured to be rotatable relative to the transmission shaft 16, and is provided so as to rotate integrally with the pump 12 of the torque converter 10. That is, the rotating shaft 18 of the engine rotates integrally with the pump 12 of the torque converter 10 in a state in which a rotation axis of the rotating shaft 18 matches that of the transmission shaft 16. With this, the rotating shaft 18 of the engine is capable of rotating with the driving force transmitted from the engine without the intervention of the fluid transmission in the torque converter 10.

A first sprocket 41 is coupled to the rotating shaft 18 of the engine via a first one-way clutch 42. The first one-way clutch 42 couples the first sprocket 41 and the rotating shaft 18 of the engine so as to allow the first sprocket 41 and the rotating shaft 18 of the engine to rotate integrally with each other in one of rotation directions of the rotating shaft 18 of the engine, and allow the first sprocket 41 and the rotating shaft 18 of the engine to rotate relative to each other in the other of the rotation directions.

On the other hand, similarly to the drive shaft 21, the output shaft 25 of the transmission portion 20 is provided as the output shaft of the transmission portion 20 from which the driving force subjected to the shifting in the transmission portion 20 is output, and is provided so as to rotate at the same rotational speed as that of the drive shaft 21. The output shaft 25 of the transmission portion 20 is provided so as to be oriented parallel with the rotating shaft 18 of the engine. A second sprocket 51 is coupled to the output shaft 25 of the transmission portion 20 via a second one-way clutch 52. The second one-way clutch 52 couples the second sprocket 51 and the output shaft 25 of the transmission portion 20 so as to allow the second sprocket 51 and the output shaft 25 of the transmission portion 20 to rotate integrally with each other in one of rotation directions of the output shaft 25 of the transmission portion 20 and allow the second sprocket 51 and the output shaft 25 of the transmission portion 20 to rotate relative to each other in the other of the rotation directions.

The oil pump 30 is a mechanical oil pump that operates with the driving force input from an input shaft 31 to thereby generate the hydraulic pressure, and the input shaft 31 is disposed so as to be oriented parallel with the rotating shaft 18 of the engine and the output shaft 25 of the transmission portion 20. A third sprocket 35 for the input shaft 31 of the oil pump 30 is mounted to the input shaft 31, and a drive chain 60 that transmits the driving force between pulleys is wound on the third sprocket 35, the first sprocket 41, and the second sprocket 51. That is, the driving force from the first sprocket 41 and the second sprocket 51 can be transmitted to the third sprocket 35 using one drive chain 60.

A path that transmits the driving force to the oil pump 30 by using the first sprocket 41 and the third sprocket 35 serves as a first transmission path 40 that transmits the driving force generated in the engine to the oil pump 30 via the first one-way clutch 42. On the other hand, a path that transmits the driving force to the oil pump 30 by using the second sprocket 51 and the third sprocket 35 serves as a second transmission path 50 that transmits the driving force from the output shaft 25 of the transmission portion 20 to the oil pump 30 via the second one-way clutch 52.

The driving force can be transmitted to the oil pump 30 using the first transmission path 40 and the second transmission path 50, and the speed ratio when the driving force is transmitted to the oil pump 30 is smaller in the first transmission path 40 than the speed ratio in the second transmission path 50. That is, when the engine is operated and the vehicle is caused to run, the first transmission path 40 is capable of transmitting the driving force to the oil pump 30 at the rotational speed higher than that of the second transmission path 50.

Specifically, the transmission portion 20 is capable of performing shifting, and a speed ratio b between the engine and the oil pump 30 in the first transmission path 40 is set to be smaller than a speed ratio obtained by multiplying the smallest speed ratio a of the transmission portion 20 by a speed ratio c between the transmission portion 20 and the oil pump 30 in the second transmission path 50. The smallest speed ratio a of the transmission portion 20 in this case is a speed ratio in a state in which the rotational speed of the drive shaft 21 or the output shaft 25 of the transmission portion 20 is maximized relative to the rotational speed of the transmission shaft 16 in the transmission portion 20 capable of performing the shifting. The speed ratio b between the engine and the oil pump 30 in the first transmission path 40 is a speed ratio between the first sprocket 41 and the third sprocket 35. The speed ratio c between the transmission portion 20 and the oil pump 30 in the second transmission path 50 is a speed ratio between the second sprocket 51 and the third sprocket 35.

Figure 3:
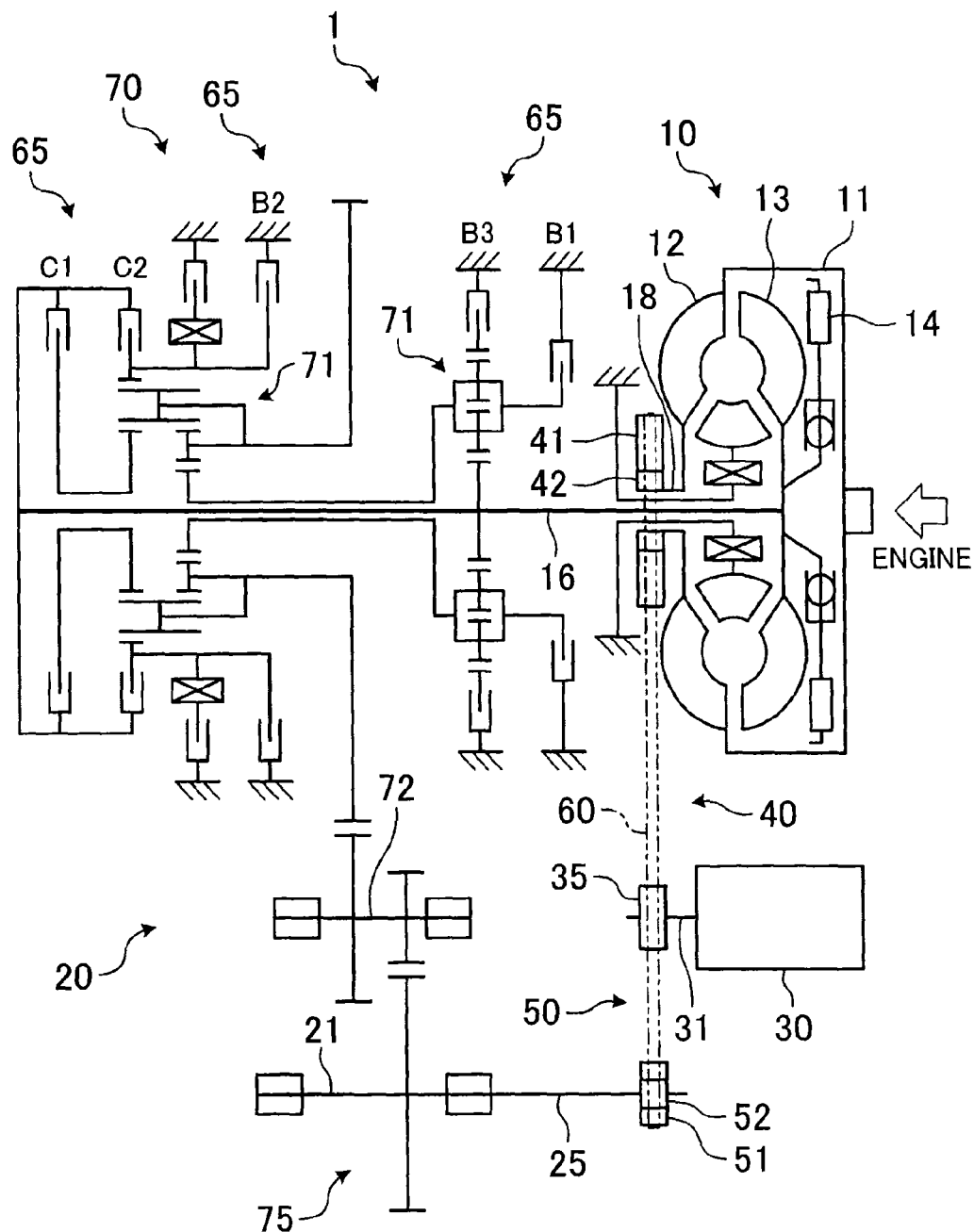
FIG. 3 is an explanatory view of a configuration of a transmission portion shown in FIG. 1.

FIG. 3 is an explanatory view of the configuration of the transmission portion shown in FIG. 1. As an example of the transmission portion 20 capable of outputting the driving force transmitted from the engine after the driving force is subjected to the gear shift, the case where the transmission portion 20 includes a stepped transmission 70 as a stepped transmission mechanism will be described. In this case, the transmission portion 20 includes the stepped transmission 70, a counter shaft 72, and a differential device 75. The stepped transmission 70 includes a plurality of planetary gear mechanisms 71, a plurality of brakes B1, B2, and B3, and clutches C1 and C2 as engaging elements.

The stepped transmission 70 is capable of changing the transmission path when the driving force is transmitted using the planetary gear mechanisms 71 by switching between the engagement and disengagement of the brakes B1, B2, and B3 and the clutches C1 and C2 and switching the speed ratio from the input side of the stepped transmission 70 to the output side thereof. In addition, the stepped transmission 70 is capable of not only switching the speed ratio but also interrupting the transmission of the driving force input to the stepped transmission 70 to the output side by switching between the engagement and disengagement of the brakes B1, B2, and B3 and the clutches C1 and C2.

The driving force output from the stepped transmission 70 is transmitted to the differential device 75 via the counter shaft 72, transmitted from the differential device 75 to the drive shaft 21, then output from the transmission portion 20. With this, the driving force transmitted to the differential device 75 is transmitted to the drive wheel 22 and can be used as the driving force during the running of the vehicle. A part of the driving force transmitted to the differential device 75 is also transmitted to the output shaft 25 of the transmission portion 20 coupled to the differential device 75.

On the other hand, when the transmission to the output side of the stepped transmission 70 is interrupted by switching between the engagement and disengagement of the brakes B1, B2, and B3 and the clutches C1 and C2 of the stepped transmission 70, the driving force input to the stepped transmission 70 is not transmitted to the differential device 75, and is not transmitted to the drive wheel 22. Thus, the brakes B1, B2, and B3 and the clutches C1 and C2 that are capable of interrupting the transmission of the driving force constitute a power transmission interruption device 65 capable of interrupting the transmission of the driving force generated in the engine to the drive wheel 22.

In addition, the transmission portion 20 is capable of switching the transmission path of the driving force in the planetary gear mechanisms 71 by switching between the engagement and disengagement of the brakes B1, B2, and B3 and the clutches C1 and C2, and is capable of switching the speed ratio by switching a ratio between the rotational speed of input to the stepped transmission 70 and the rotational speed of output to the differential device 75 from the stepped transmission 70. Accordingly, the smallest speed ratio a of the transmission portion 20 corresponds to the speed ratio of the transmission shaft 16, the drive shaft 21, and the output shaft 25 of the transmission portion 20 in a state in which the rotational speed of the driving force output to the differential device 75 from the stepped transmission 70 is maximized relative to the rotational speed of the driving force input to the stepped transmission 70 from the transmission shaft 16.

The vehicle drive device 1 according to the first embodiment has the configuration described thus far. Hereinbelow, operations of the vehicle drive device 1 will be described. The vehicle on which the vehicle drive device 1 runs with the transmission of the driving force generated in the engine to the drive wheel 22. Specifically, the driving force generated in the engine is transmitted to the transmission portion 20 via the torque converter 10, the speed ratio is changed to the speed ratio suitable for the running state of the vehicle or the driving operation of a driver in the transmission portion 20, and the driving force is output by the drive shaft 21 and is transmitted to the drive wheel 22. The drive wheel 22 rotates with the driving force, and the vehicle thereby runs.

The transmission portion 20 that performs the shifting during the running of the vehicle switches a speed stage of the stepped transmission 70 to the target speed stage by appropriately performing the engagement and disengagement of the brakes B1, B2, and B3 and the clutches C1 and C2 of the stepped transmission 70 using the hydraulic pressure generated in the oil pump 30. With this, the speed ratio when the driving force is transmitted to the drive wheel 22 is switched to the speed ratio suitable for the running state of the vehicle or the like.

The oil pump 30 that generates the hydraulic pressure used when the speed ratio in the transmission portion 20 is switched operates with the driving force generated in the engine and the driving force transmitted from the transmission portion 20 during the running of the vehicle, and generates the hydraulic pressure. A description will be given of a state in which the oil pump 30 operates with the driving force generated in the engine first. The driving force generated in the engine is transmitted to the torque converter 10, and most of the driving force is transmitted to the transmission portion 20 via the transmission shaft 16 from the turbine 13 or the lock-up mechanism 14 of the torque converter 10.

Herein, the rotating shaft 18 of the engine to which the first sprocket 41 constituting the first transmission path 40 is mounted is coupled to the pump 12 of the torque converter 10. Accordingly, a part of the driving force transmitted to the torque converter 10 is transmitted to the first sprocket 41 via the rotating shaft 18 of the engine and the first one-way clutch 42, and the first sprocket 41 rotates together with the pump 12 irrespective of the rotation of the transmission shaft 16.

The driving force transmitted to the first sprocket 41 is transmitted to the third sprocket 35 by the drive chain 60, transmitted to the input shaft 31 to which the third sprocket 35 is mounted, and transmitted to the oil pump 30. That is, a part of the driving force generated in the engine is transmitted to the oil pump 30 using the first transmission path 40 without the intervention of the transmission portion 20. The oil pump 30 operates with the driving force transmitted in this manner, generates the hydraulic pressure, and operates the individual portions of the vehicle drive device 1.

A description will be given of a state in which the oil pump 30 operates with the driving force transmitted from the transmission portion 20 during the running of the vehicle. The drive shaft 21 and the output shaft 25 of the transmission portion 20 that rotate with the driving force output from the transmission portion 20 rotate at the same rotational speed, and the drive shaft 21 rotates together with the drive wheel 22. Accordingly, even in the case where the driving force generated in the engine is small, the drive shaft 21 rotates together with the drive wheel 22 as long as the vehicle is running, and the output shaft 25 of the transmission portion 20 rotates with the driving force transmitted from the drive wheel 22 at the same rotational speed as that of the drive shaft 21.

Thus, the driving force transmitted to the output shaft 25 of the transmission portion 20 via the transmission portion 20 from the drive wheel 22 is also transmitted to the second sprocket 51 via the second one-way clutch 52 constituting the second transmission path 50, and the second sprocket 51 rotates together with the output shaft 25 of the transmission portion 20. The driving force transmitted to the second sprocket 51 is transmitted to the third sprocket 35 by the drive chain 60, and is transmitted to the oil pump 30. That is, the driving force from the drive wheel 22 that rotates with the running of the vehicle is transmitted to the oil pump 30 using the second transmission path 50. The oil pump 30 operates with the driving force transmitted in this manner, generates the hydraulic pressure, and operates the individual portions of the vehicle drive device 1.

Thus, the driving force is transmitted to the oil pump 30 using the first transmission path 40 and the second transmission path 50. The first one-way clutch 42 is provided in the first transmission path 40 and the second one-way clutch 52 is provided in the second transmission path 50, and hence, in reality, the driving force is transmitted to the oil pump 30 from one of the first transmission path 40 and the second transmission path 50.

Specifically, the first one-way clutch 42 transmits the driving force in the case where the rotational speed of the third sprocket 35 when the driving force is transmitted to the third sprocket 35 from the first sprocket 41 is higher than the rotational speed of the third sprocket 35 when the driving force is transmitted to the third sprocket 35 from the second sprocket 51. Conversely, the first one-way clutch 42 fails to engage in the case where the rotational speed of the third sprocket 35 when the driving force is transmitted to the third sprocket 35 from the first sprocket 41 is lower than the rotational speed of the third sprocket 35 when the driving force is transmitted to the third sprocket 35 from the second sprocket 51.

Similarly, the second one-way clutch 52 transmits the driving force in the case where the rotational speed of the third sprocket 35 when the driving force is transmitted to the third sprocket 35 from the second sprocket 51 is higher than the rotational speed of the third sprocket 35 when the driving force is transmitted to the third sprocket 35 from the first sprocket 41. Conversely, the second one-way clutch 52 fails to engage in the case where the rotational speed of the third sprocket 35 when the driving force is transmitted to the third sprocket 35 from the second sprocket 51 is lower than the rotational speed of the third sprocket 35 when the driving force is transmitted to the third sprocket 35 from the first sprocket 41.

Thus, of the first transmission path 40 and the second transmission path 50, the transmission path having the higher rotational speed when the driving force is transmitted to the oil pump 30 can transmit the driving force and, in the transmission path having the lower rotational speed, the first one-way clutch 42 or the second one-way clutch 52 fails to engage, and the difference in rotational speed can be thereby absorbed.

On the other hand, the speed ratio b between the engine and the oil pump 30 in the first transmission path 40 is set to be smaller than the speed ratio obtained by multiplying the smallest speed ratio a of the transmission portion 20 by the speed ratio c between the transmission portion 20 and the oil pump 30 in the second transmission path 50. Accordingly, in a state in which the vehicle runs with the driving force generated in the engine, the rotational speed when the driving force is transmitted to the oil pump 30 in the first transmission path 40 is always higher than the rotational speed when the driving force is transmitted to the oil pump 30 in the second transmission path 50 irrespective of the speed stage of the transmission portion 20.

That is, in the transmission portion 20, as the speed stage is shifted to a low speed side, the output rotational speed to the drive shaft 21 or the output shaft 25 of the transmission portion 20 relative to the input rotational speed from the transmission shaft 16 is reduced. Conversely, as the speed stage is shifted to a high speed side, the output rotational speed to the drive shaft 21 or the output shaft 25 of the transmission portion 20 is increased. Accordingly, by setting the speed ratio b of the first transmission path 40 to the speed ratio smaller than the speed ratio obtained by multiplying the smallest speed ratio a of the transmission portion 20 by the speed ratio c of the second transmission path 50, the rotational speed of the input shaft 31 based on the transmission of the driving force in the first transmission path 40 is higher than the rotational speed of the input shaft 31 based on the transmission of the driving force in the second transmission path 50 irrespective of the speed stage of the transmission portion 20.

Figure 4:
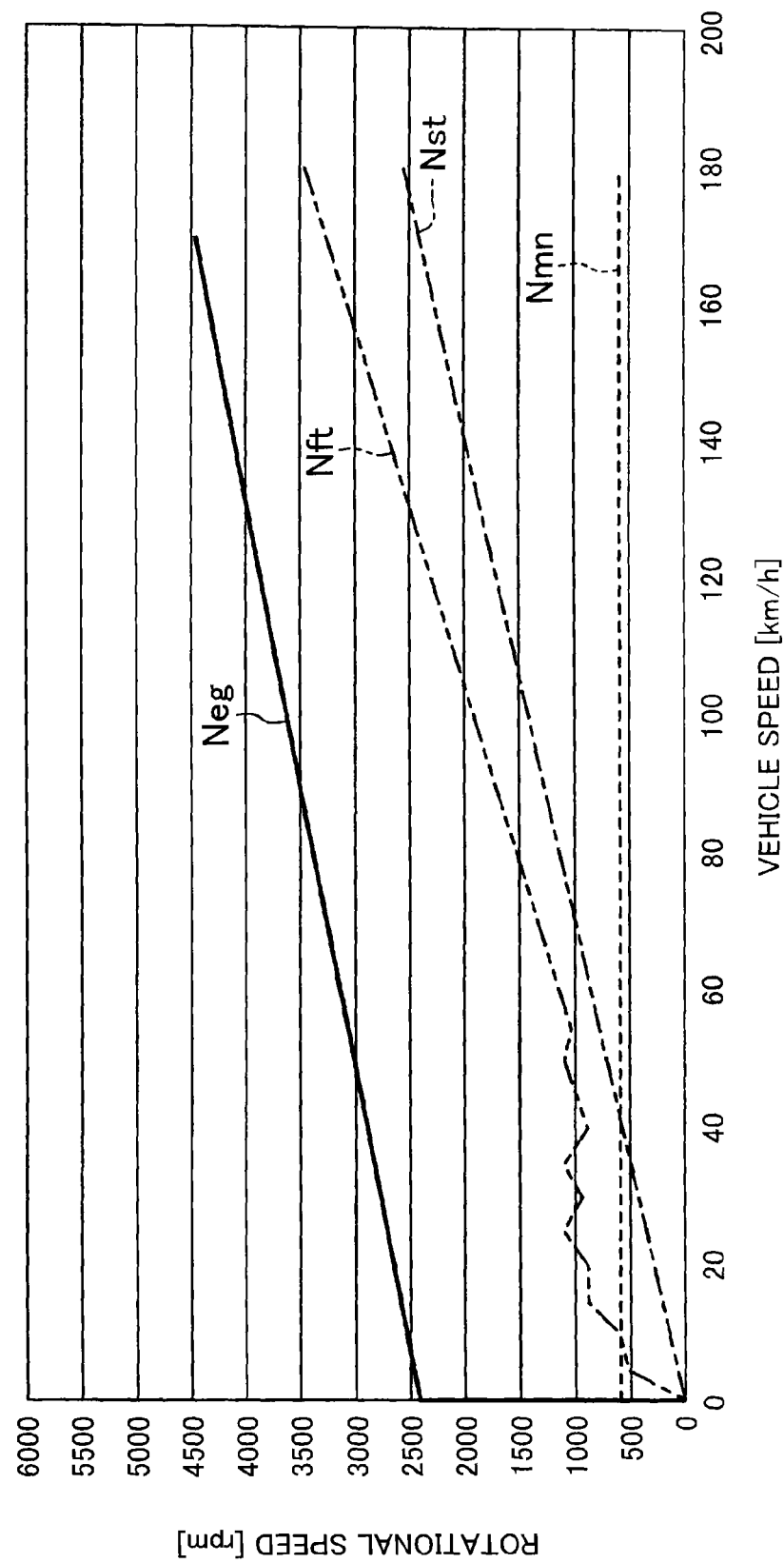
FIG. 4 is an explanatory view showing a relationship between a transmission rotational speed of a driving force in a first transmission path and the transmission rotational speed of the driving force in a second transmission path.

FIG. 4 is an explanatory view showing a relationship between the transmission rotational speed of the driving force in the first transmission path and the transmission rotational speed of the driving force in the second transmission path. The rotating shaft 18 of the engine rotates with the driving force generated in the engine without the intervention of the transmission portion 20, and hence a first rotational speed Nft as the rotational speed of the input shaft 31 of the oil pump 30 when the driving force is transmitted to the oil pump 30 using the first transmission path 40 is substantially proportional to an engine rotational speed Neg. Accordingly, the first rotational speed Nft becomes higher as the engine rotational speed Neg becomes higher, and the first rotational speed Nft becomes lower as the engine rotational speed Neg becomes lower.

In addition, the output shaft 25 of the transmission portion 20 rotates at the same rotational speed as that of the drive shaft 21 that rotates together with the drive wheel 22, and hence a second rotational speed Nst as the rotational speed of the input shaft 31 of the oil pump 30 when the driving force is transmitted to the oil pump 30 using the second transmission path 50 is substantially proportional to a vehicle speed. Accordingly, the second rotational speed Nst becomes higher as the vehicle speed becomes higher, and the second rotational speed Nst becomes lower as the vehicle speed becomes lower.

Note that each of the first rotational speed Nft and the second rotational speed Nst is higher than a minimum required rotational speed Nmn as the rotational speed required for the generation of the hydraulic pressure by the oil pump 30 in most of the running state during the running of the vehicle such that the oil pump 30 can be properly driven during the running of the vehicle. With this, during the running of the vehicle, even when the driving force is transmitted to the oil pump 30 using the first transmission path 40 or the second transmission path 50, the oil pump 30 is capable of generating the hydraulic pressure in many cases.

The speed ratio b of the first transmission path 40 is smaller than the speed ratio obtained by multiplying the smallest speed ratio a of the transmission portion 20 by the speed ratio c of the second transmission path 50, and hence, in a state in which the engine is operated, the first rotational speed Nft is higher than the second rotational speed Nst irrespective of the engine rotational speed Neg or the vehicle speed. Accordingly, during the running of the vehicle in the state in which the engine is operated, the second one-way clutch 52 fails to engage, and the oil pump 30 always operates with the driving force transmitted using the first transmission path 40 and generates the hydraulic pressure.

The vehicle that includes the vehicle drive device 1 according to the first embodiment is capable of coasting as running by inertia of the vehicle in a state in which the engine is stopped and the transmission of the driving force to the drive wheel 22 from the engine is interrupted using the power transmission interruption device 65 of the transmission portion 20 during the running of the vehicle. The engine is stopped during the coasting, and hence the first transmission path 40 does not transmit the driving force to the oil pump 30, and the first rotational speed Nft becomes 0.

In contrast to this, in the second transmission path 50, the second rotational speed Nst changes in accordance with the vehicle speed, and hence the second rotational speed Nst has the rotational speed corresponding to the vehicle speed as long as the vehicle runs. Accordingly, in the second transmission path 50, the driving force is transmitted to the oil pump 30 at the rotational speed corresponding to the vehicle speed. In this case, the second rotational speed Nst is higher than the first rotational speed Nft, and hence the first one-way clutch 42 fails to engage, and the oil pump 30 operates with the driving force transmitted using the second transmission path 50 and generates the hydraulic pressure. In other words, by providing the second transmission path 50, even during the coasting in which the engine is stopped, it is possible to transmit the driving force to the oil pump 30 and cause the oil pump 30 to generate the hydraulic pressure.

In the vehicle drive device 1 according to the first embodiment described thus far, since the speed ratio b of the first transmission path 40 is set to be smaller than the speed ratio obtained by multiplying the smallest speed ratio a of the transmission portion 20 by the speed ratio c of the second transmission path 50, the oil pump 30 is always driven by the driving force generated in the engine when the engine is connected to the drive wheel 22. Accordingly, it is possible to prevent the drive source of the oil pump 30 from being switched from the driving force from the engine to the driving force from the drive wheel 22 in the state in which the engine is connected to the drive wheel 22. With this, it is possible to prevent the occurrence of a situation in which the drive source of the oil pump 30 is switched from the driving force from the engine to the driving source from the drive wheel 22 due to a reduction in engine rotational speed caused by, e.g., fuel cut of the engine, an engine braking force is thereby changed, and a shock occurs. As a result, it is possible to suppress a shock that occurs due to switching of the transmission path of the driving force to the oil pump 30.

The vehicle drive device 1 according to a second embodiment has a configuration substantially similar to that of the vehicle drive device 1 according to the first embodiment, and is characterized in that the transmission portion 20 performs shifting using a CVT 80. The other configurations are the same as those in the first embodiment, and hence the description thereof will be omitted by retaining the same reference numerals.

Figure 5:
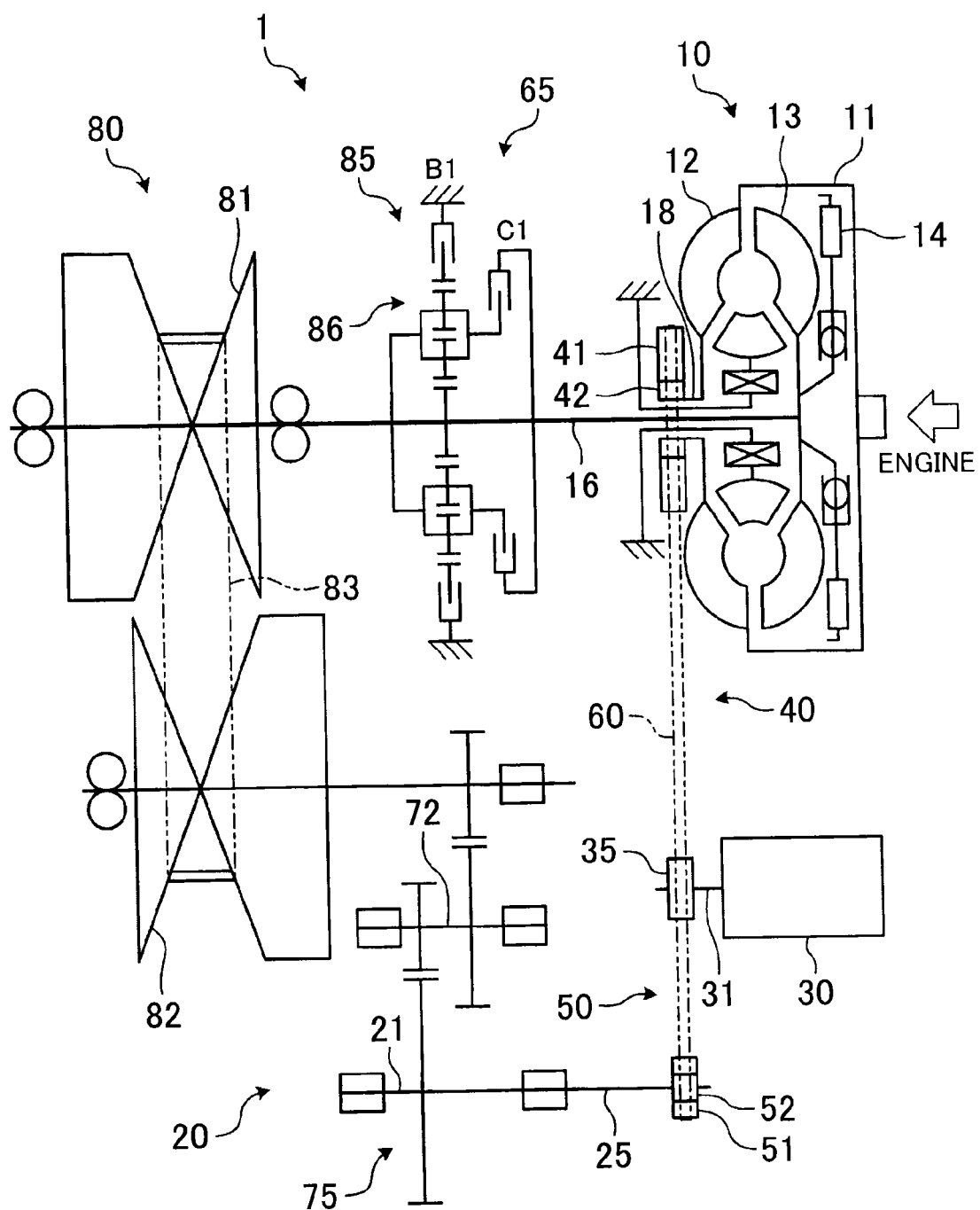
FIG. 5 is a configuration diagram of a principal portion of the vehicle drive device according to a second embodiment.

FIG. 5 is a configuration diagram of a principal portion of the vehicle drive device according to the second embodiment. Similarly to the vehicle drive device 1 according to the first embodiment, the vehicle drive device 1 according to the second embodiment has the torque converter 10 and the transmission portion 20, and includes the first transmission path 40 and the second transmission path 50 as the paths for transmitting the driving force to the oil pump 30. Unlike the transmission portion 20 of the vehicle drive device 1 according to the first embodiment, the transmission portion 20 has the CVT 80 and a forward-reverse switching device 85 in the vehicle drive device 1 according to the second embodiment. That is, instead of the stepped transmission 70 of the transmission portion 20 of the vehicle drive device 1 according to the first embodiment, the transmission portion 20 of the vehicle drive device 1 according to the second embodiment has the CVT 80 and the forward-reverse switching device 85.

The transmission shaft 16 that outputs the driving force transmitted to the torque converter 10 from the engine is coupled to the forward-reverse switching device 85. The forward-reverse switching device 85 has a planetary gear mechanism 86, the brake B1, and the clutch C1, and is capable of switching the rotation direction of the driving force transmitted from the transmission shaft 16 to any direction and outputting the driving force to the CVT 80. With this, the forward-reverse switching device 85 is capable of switching the running direction of the vehicle that runs with the driving force generated in the engine between a forward direction and a reverse direction.

In addition, the forward-reverse switching device 85 is capable of interrupting the transmission of the driving force to the CVT 80 by appropriately combining the engagement and disengagement of the brake B1 and the clutch C1. Accordingly, each of the brake B1 and the clutch C1 is provided as the power transmission interruption device 65 that is capable of interrupting the transmission of the driving force generated in the engine to the drive wheel 22.

The CVT 80 is provided as a transmission capable of continuously changing the speed ratio between the input rotational speed and the output rotational speed of the driving force transmitted from the forward-reverse switching device 85. The CVT 80 has a primary pulley 81 as an input pulley, a secondary pulley 82 as an output pulley, and a belt 83 that is wound on the pulleys, and is configured as a belt-type CVT that performs transmission of a torque between the two pulleys using the belt 83.

The driving force transmitted from the forward-reverse switching device 85 is input to the primary pulley 81, and the secondary pulley 82 is capable of outputting the driving force to the differential device 75 via the counter shaft 72. The CVT 80 provided in this manner is capable of changing the rotational speed of the driving force input from the forward-reverse switching device 85 by changing the speed ratio between the primary pulley 81 and the secondary pulley 82 and outputting the driving force to the differential device 75.

In the vehicle drive device 1 according to the second embodiment as well, the first sprocket 41 is mounted to the rotating shaft 18 of the engine via the first one-way clutch 42 in the first transmission path 40, and the second sprocket 51 is mounted to the output shaft 25 of the transmission portion 20 via the second one-way clutch 52 in the second transmission path 50. With this, the oil pump 30 is capable of operating with the driving force transmitted from the first transmission path 40 or the second transmission path 50. In addition, in the vehicle drive device 1 according to the second embodiment as well, the speed ratio b between the engine and the oil pump 30 in the first transmission path 40 is set to be smaller than the speed ratio obtained by multiplying the smallest speed ratio a of the transmission portion 20 by the speed ratio c between the transmission portion 20 and the oil pump 30 in the second transmission path 50.

The vehicle drive device 1 according to the second embodiment has the configuration described thus far. Hereinbelow, operations of the vehicle drive device 1 will be described. In the vehicle on which the vehicle drive device 1 is mounted, the driving force generated in the engine is transmitted to the forward-reverse switching device 85 via the torque converter 10, and is transmitted to the CVT 80 after the rotation direction of the driving force is appropriately switched by the forward-reverse switching device 85.

In the CVT 80, the speed ratio between the primary pulley 81 and the secondary pulley 82 is appropriately changed continuously in accordance with the running state of the vehicle and the driving operation of a driver by changing a winding diameter of the belt 83 in each of the primary pulley 81 and the secondary pulley 82. With this, the speed ratio when the driving force is transmitted to the drive wheel 22 is continuously switched to the speed ratio suitable for the running state of the vehicle or the like.

The oil pump 30 operates with the driving force transmitted from the first transmission path 40 or the second transmission path 50, and the speed ratio b of the first transmission path 40 is smaller than the speed ratio obtained by multiplying the smallest speed ratio a of the transmission portion 20 by the speed ratio c of the second transmission path 50. Accordingly, during the running of the vehicle in the state in which the engine is operated, the first rotational speed Nft (see FIG. 4) is higher than the second rotational speed Nst (see FIG. 4), and the oil pump 30 always operates with the driving force transmitted using the first transmission path 40. Consequently, during the running of the vehicle in the state in which the engine is operated, the oil pump 30 operates with the driving force transmitted using the first transmission path 40, and generates the hydraulic pressure irrespective of the speed ratio of the CVT 80 in which the speed ratio is continuously switched.

In the vehicle drive device 1 according to the second embodiment described thus far, the CVT 80 is used in the transmission portion 20, and the speed ratio b of the first transmission path 40 is set to be smaller than the speed ratio obtained by multiplying the smallest speed ratio a of the transmission portion 20 by the speed ratio c of the second transmission path 50. With this, when the engine is connected to the drive wheel 22, the oil pump 30 is always driven by the driving force generated in the engine irrespective of the speed ratio of the CVT 80 in which the speed ratio is continuously switched. As a result, it is possible to suppress the shock that occurs due to switching of the transmission path of the driving force to the oil pump 30.

Figure 6:
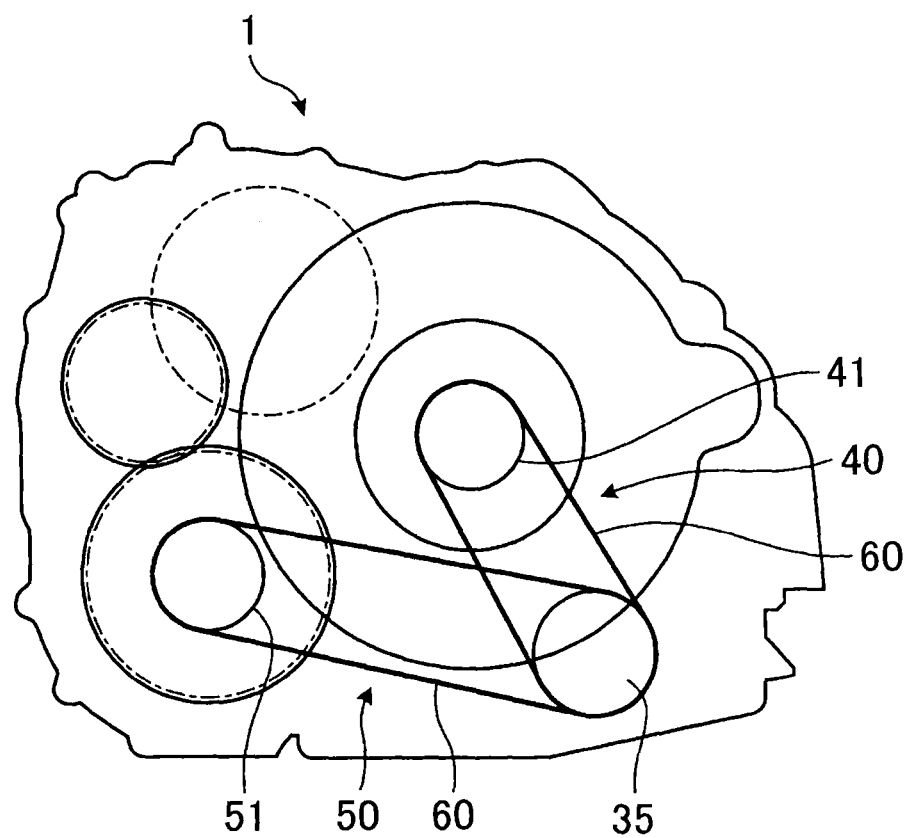
FIG. 6 shows the vehicle drive device according to a third embodiment, and is an explanatory view in the case where different drive chains are used in the first transmission path and the second transmission path.

Note that, in the vehicle drive device 1 according to the first embodiment described above, the drive chain 60 is shared by the first transmission path 40 and the second transmission path 50, but, as the drive chain 60, different drive chains may be used in the first transmission path 40 and the second transmission path 50. FIG. 6 shows the vehicle drive device 1 according to a third embodiment as a modification of the vehicle drive device according to the first embodiment, and is an explanatory view in the case where different drive chains are used in the first transmission path and the second transmission path. In the case where different drive chains 60 are used in the first transmission path 40 and the second transmission path 50, the third sprocket 35 for the first transmission path 40 and another third sprocket 35 for the second transmission path 50 are provided in the input shaft 31 of the oil pump 30. The two third sprockets 35 provided in the input shaft 31 of the oil pump 30 are provided at different positions in an axial direction.

The drive chain 60 for the first transmission path 40 is wound on the third sprocket 35 for the first transmission path 40 and the first sprocket 41. The drive chain 60 for the second transmission path 50 different from the drive chain 60 for the first transmission path 40 is wound on the third sprocket 35 for the second transmission path 50 and the second sprocket 51. Thus, in the case where different drive chains 60 are used in the first transmission path 40 and the second transmission path 50 as well, by setting the speed ratio b of the first transmission path 40 to the speed ratio smaller than the speed ratio obtained by multiplying the smallest speed ratio a of the transmission portion 20 by the speed ratio c of the second transmission path 50, it is possible to suppress the shock that occurs due to switching of the transmission path of the driving force to the oil pump 30.

Figure 7:
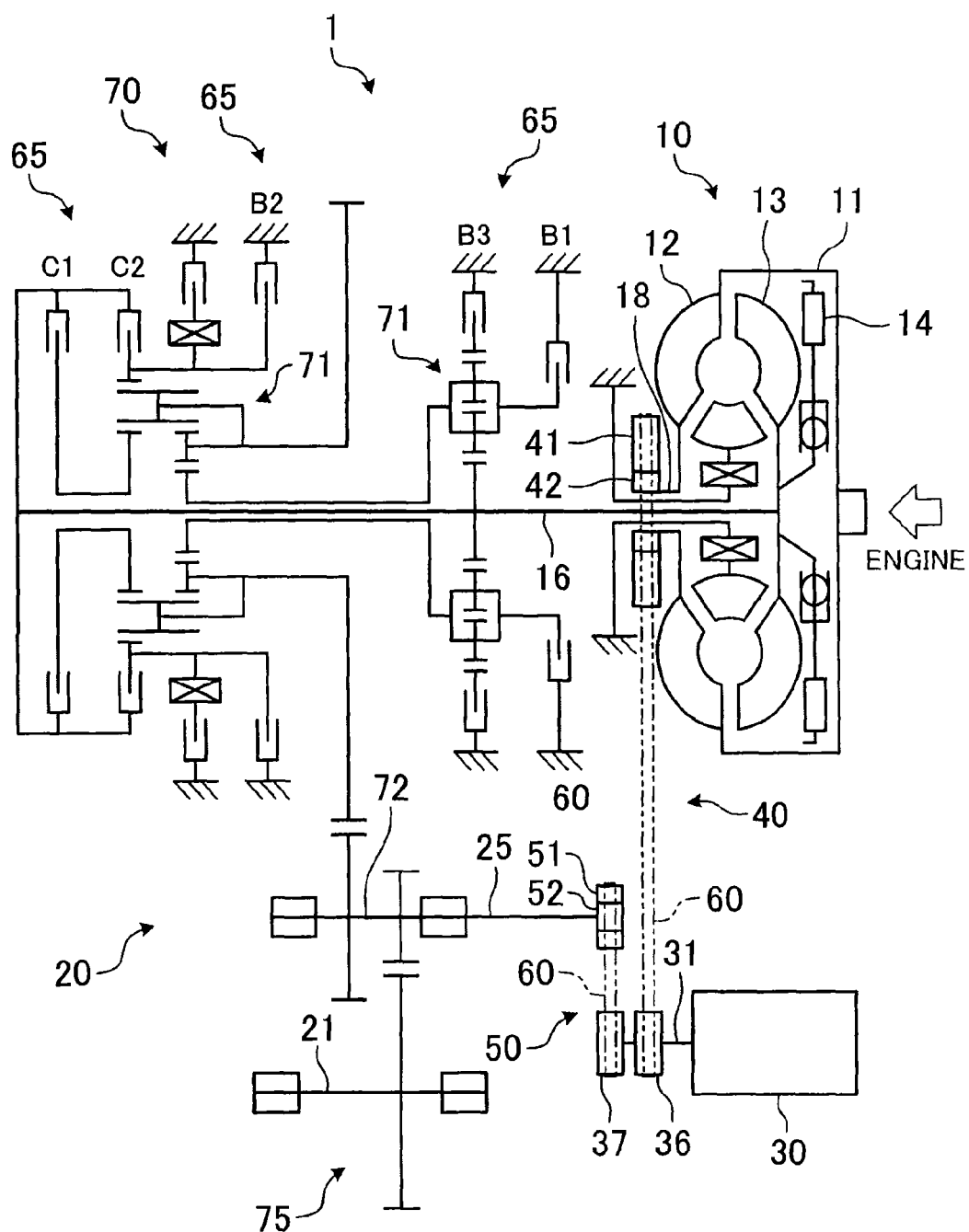
FIG. 7 shows the vehicle drive device according to a fourth embodiment, and is an explanatory view in the case where an output shaft of the transmission portion is coupled to a counter shaft.

In addition, in each of the vehicle drive devices 1 according to the first and second embodiments described above, the output shaft 25 of the transmission portion 20 is coupled to the differential device 75 and the driving force is transmitted from the differential device 75, and the output shaft 25 of the transmission portion 20 may also be coupled to an element other than the differential device 75. FIG. 7 shows the vehicle drive device 1 according to a fourth embodiment (another modification of the vehicle drive device according to the first embodiment), and is an explanatory view in the case where the output shaft of the transmission portion is coupled to the counter shaft. For example, as shown in FIG. 7, the output shaft 25 of the transmission portion 20 may be coupled to the counter shaft 72 that rotates with the driving force output from the stepped transmission 70, and the output shaft 25 of the transmission portion 20 may be configured to rotate with the driving force transmitted from the counter shaft 72. In this case as well, the drive chain 60 may be shared by the first transmission path 40 and the second transmission path 50, and different drive chains 60 may also be used in the first transmission path 40 and the second transmission path 50.

For example, in the case where different drive chains 60 are used in the first transmission path 40 and the second transmission path 50, a fourth sprocket 36 as the sprocket for the first transmission path 40 and a fifth sprocket 37 as the sprocket for the second transmission path 50 are provided in the input shaft 31 of the oil pump 30 instead of the third sprocket 35 of each of the first to third embodiments. By providing the two sprockets in the input shaft 31 of the oil pump 30, different drive chains 60 may be used in the first transmission path 40 and the second transmission path 50.

Figure 8:
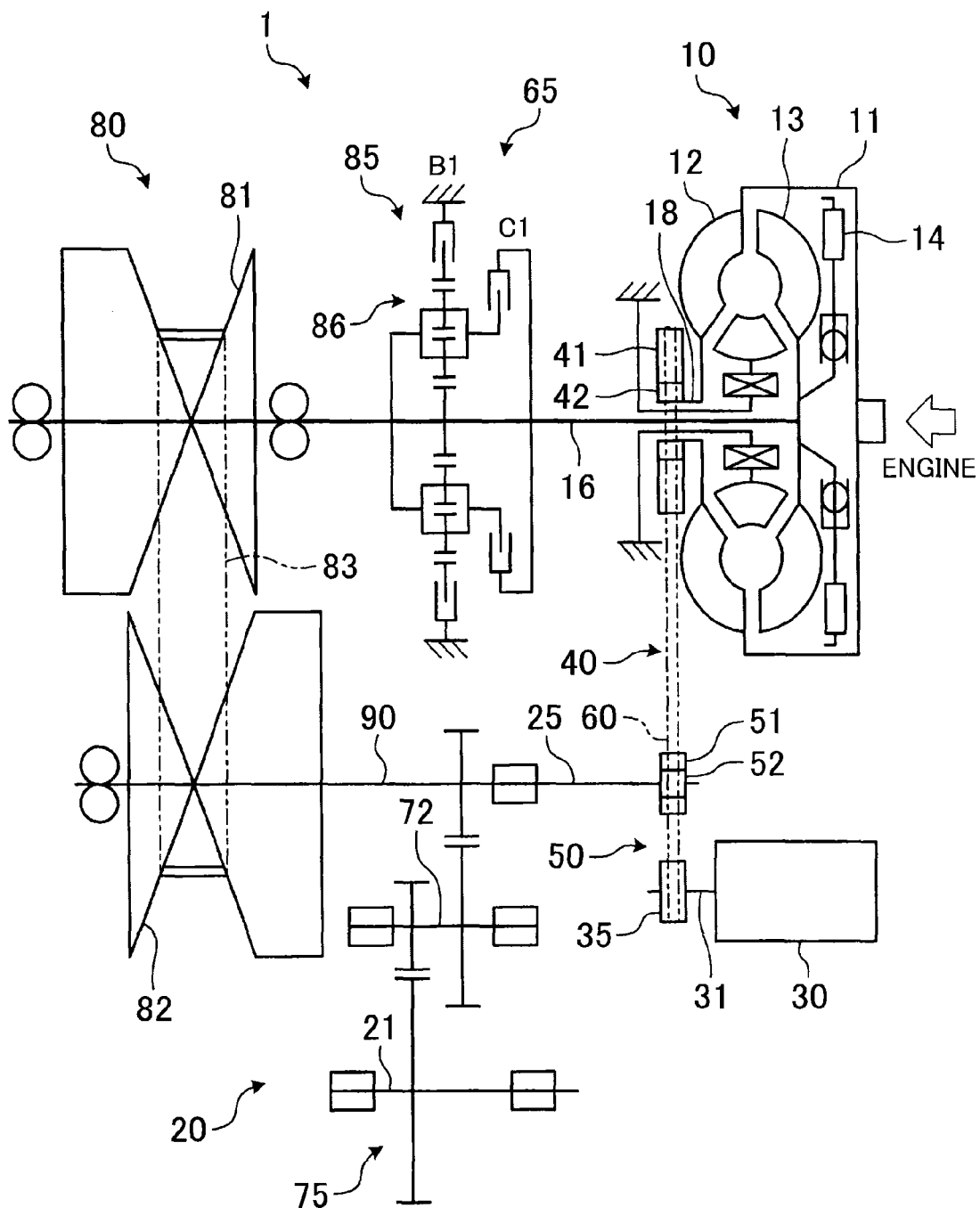
FIG. 8 shows the vehicle drive device according to a fifth embodiment, and is an explanatory view in the case where the output shaft of the transmission portion is coupled to a rotating shaft of a secondary pulley.

FIG. 8 shows the vehicle drive device 1 according to a fifth embodiment (a modification of the vehicle drive device according to the second embodiment), and is an explanatory view in the case where the output shaft of the transmission portion is coupled to the rotating shaft of the secondary pulley. Alternatively, as shown in FIG. 8, the output shaft 25 of the transmission portion 20 may be coupled to a secondary pulley shaft 90 as the rotating shaft of the secondary pulley 82 of the CVT 80, and the output shaft 25 of the transmission portion 20 may be configured to rotate with the driving force transmitted from the secondary pulley shaft 90. Thus, in the case where the output shaft 25 of the transmission portion 20 is coupled to the counter shaft 72 or the secondary pulley shaft 90, by setting the speed ratio b of the first transmission path 40 to the speed ratio smaller than the speed ratio obtained by multiplying the smallest speed ratio a of the transmission portion 20 by the speed ratio c of the second transmission path 50, it is possible to suppress the shock that occurs due to switching of the transmission path of the driving force to the oil pump 30. That is, in the vehicle drive device 1 according to the fifth embodiment, the output shaft 25 of the transmission portion 20 may use not only the drive shaft 21 but also the output shaft of the secondary pulley 82 that rotates at the same rotational speed as that of the drive shaft 21, and may also use the drive shaft 21 that rotates at the same rotational speed as that of the secondary pulley shaft 90.

In addition, in each of the vehicle drive devices 1 according to the first and second embodiments described above, each of the first transmission path 40 and the second transmission path 50 performs the transmission of the driving force by using the drive chain 60, but an element other than the drive chain 60 may also be used in the transmission of the driving force. The transmission of the driving force in each of the first transmission path 40 and the second transmission path 50 may also be performed by using, e.g., a belt or a gear. As long as the speed ratio b of the first transmission path 40 is smaller than the speed ratio obtained by multiplying the smallest speed ratio a of the transmission portion 20 by the speed ratio c of the second transmission path 50 irrespective of the transmission means of the driving force in each of the first transmission path 40 and the second transmission path 50, the transmission means of the driving force may be any transmission means.

Further, the transmission portion 20 is capable of changing the speed ratio by using the stepped transmission 70 that includes the planetary gear mechanisms 71 in the vehicle drive device 1 according to the first embodiment described above, and the transmission portion 20 is capable of changing the speed ratio by using the CVT 80 in the vehicle drive device 1 according to the second embodiment, and the transmission portion 20 may also be capable of changing the speed ratio by using a mechanism other than them.

Furthermore, the power transmission interruption device 65 is constituted by the brakes B1, B2, and B3 and the clutches C1 and C2 of the stepped transmission 70 in the vehicle drive device 1 according to the first embodiment, and the power transmission interruption device 65 is constituted by the brake B1 and the clutch C1 of the forward-reverse switching device 85 in the vehicle drive device 1 according to the second embodiment, and the power transmission interruption device 65 may also be constituted by an element other than them. The power transmission interruption device 65 may also be constituted by, e.g., a clutch provided separately from the transmission portion 20. The coasting can be performed by stopping the engine and interrupting the transmission of the driving force to the drive wheel 22 as long as the power transmission interruption device 65 is provided so as to be able to interrupt the transmission of the driving force generated in the engine to the drive wheel 22, and hence the configuration thereof may be any configuration.

In addition, the oil pump 30 may also be provided so as to be coupled to a member that is directly coupled to the rotating shaft of the engine and thereby rotates by being directly coupled to the rotating shaft 18 of the engine or being positioned on the transmission path of the driving force from the engine to the torque converter 10, and operate with the driving force from the member. In this case, the speed ratio b between the engine and the oil pump 30 is 1. In addition, in this case as well, by providing the first one-way clutch 42 between the member that is directly coupled to the rotating shaft of the engine and thereby rotates and the oil pump 30, the first transmission path 40 is configured.

What is claimed is:

1. A vehicle drive device comprising:
   an oil pump;
   a first one-way clutch;
   a first transmission path configured to transmit a driving force generated in an engine to the oil pump via the first one-way clutch;
   a second one-way clutch;
   a second transmission path configured to transmit a driving force from an output shaft of a transmission portion to the oil pump via the second one-way clutch; and
   a power transmission interruption device configured to interrupt transmission of the driving force generated in the engine to a drive wheel,
   wherein a speed ratio between the engine and the oil pump in the first transmission path is set to be smaller than a speed ratio obtained by multiplying a smallest speed ratio of the transmission portion by a speed ratio between the transmission portion and the oil pump in the second transmission path.

2. The vehicle drive device according to claim 1, further comprising:
   a first sprocket coupled to a rotating shaft of the engine via the first one-way clutch;
   a second sprocket coupled to the output shaft of the transmission portion via the second one-way clutch;
   a third sprocket coupled to the oil pump; and
   one chain or one belt configured to transmit power to any of the first sprocket, the second sprocket, and the third sprocket.

3. The vehicle drive device according to claim 1, wherein the transmission portion is a stepped transmission, the stepped transmission includes brakes and clutches as engaging elements, and the power transmission interruption device is constituted by at least one of the engaging elements.

* * * * *